United States Patent
Hauru et al.

(10) Patent No.: US 8,482,175 B2
(45) Date of Patent: Jul. 9, 2013

(54) PERMANENT-MAGNET SYNCHRONOUS MACHINE AND A METHOD FOR MANUFACTURING AND INSTALLING IT

(75) Inventors: Alpo Hauru, Vaasa (FI); Ari Tammi, Vaasa (FI)

(73) Assignee: Abb Technology AG, Zürich (CH)

( * ) Notice: Subject to any disclaimer, the term of this patent is extended or adjusted under 35 U.S.C. 154(b) by 0 days.

(21) Appl. No.: 13/468,465

(22) Filed: May 10, 2012

(65) Prior Publication Data

US 2012/0274166 A1 Nov. 1, 2012

Related U.S. Application Data

(63) Continuation of application No. PCT/FI2010/000069, filed on Nov. 10, 2010.

(30) Foreign Application Priority Data

Nov. 10, 2009 (FI) .................................. 20090417

(51) Int. Cl.
*H02K 21/12* (2006.01)

(52) U.S. Cl.
USPC ................................ 310/156.01; 310/156.08

(58) Field of Classification Search
USPC ................................ 310/156.08, 156.01, 156.46
See application file for complete search history.

(56) References Cited

U.S. PATENT DOCUMENTS

| 7,042,127 B2 * | 5/2006 | Tsuruta et al. | 310/156.53 |
| 7,411,388 B2 * | 8/2008 | Sagoo et al. | 324/207.25 |
| 2003/0011267 A1 | 1/2003 | Vollmer | |
| 2006/0131976 A1 * | 6/2006 | Kikuchi et al. | 310/156.46 |
| 2007/0065316 A1 | 3/2007 | Hanke et al. | |

FOREIGN PATENT DOCUMENTS

| EP | 1276212 A2 | 1/2003 |
| JP | 2001-275285 A | 10/2001 |

OTHER PUBLICATIONS

*Finnish Search Report issued on Apr. 14, 2010, for Finnish Application No. 20090417.
*Parviainen A,. "Kestomagneettitahtikoneen päämitoitus" luentomateriaali katko-opintokurssilta Kestomagneettitahtikoneen suunnittelu, Lappeenrannan teknillinen yliopisto, Jan. 13, 2005, 26 sivua, sivut 17-20.
*Seppä M., "Kestomagneettitahtikoneiden rakennevaihtoehdot hitaisiin käyttöihin" Diplomityö, Lappeenrannan teknillinen korkeakoulu, Lappeenranta 1998, 86 sivua, sivut 19, 24-27, 49-51.

* cited by examiner

*Primary Examiner* — Nguyen N Hanh
(74) *Attorney, Agent, or Firm* — Buchanan Ingersoll & Rooney PC

(57) ABSTRACT

An exemplary permanent-magnet synchronous machine is disclosed with a stator and a rotor located at the distance of the air gap ($\delta1$) from the stator. The rotor is supported on the shaft in a rotating arrangement, and a maximum value has been determined for the eccentricity between the stator and the rotor. The value is higher than one-tenth of the air gap. The magnetization of the synchronous machine is arranged with permanent magnets fitted in the rotor for creating a magnetic flux ($\phi$) which is closed via the stator, the air gap ($\delta1$), and the rotor. A relation $H \geq (10*\epsilon-\delta)*\mu_r$ applies between the thickness of the permanent magnet and the maximum value of eccentricity $\epsilon$, wherein $\delta$ is the dimensioning value of the air gap and $\mu_r$ is the relative permeability of the permanent magnet.

19 Claims, 3 Drawing Sheets

PERMANENT-MAGNET SYNCHRONOUS MACHINE AND A METHOD FOR MANUFACTURING AND INSTALLING IT

RELATED APPLICATION

This application claims priority as a continuation application under 35 U.S.C. §120 to PCT/FI2010/000069, which was filed as an International Application on Nov. 10, 2010 designating the U.S., and which claims priority to Finnish Application 20090417 filed in Finland on Nov. 10, 2009. The entire contents of these applications are hereby incorporated by reference in their entireties.

FIELD

A synchronous machine is disclosed which is excited with permanent magnets, and a method for manufacturing and installing such a machine is disclosed.

BACKGROUND INFORMATION

A target with rotating electrical machines is that the eccentricity of the rotor in relation to the stator is as small as possible. If the axis of rotation deviates from the central axis, the performance and reliability of the electrical machine decreases as the air gap of the electrical machine is not constant between the stator and the rotor in the whole rotation circumference area. Eccentricity may be cylindrical, in which case the axis lines of the stator and rotor are parallel. In this case the size of the air gap deviates in the same manner throughout the length of the machine's axis. In conical eccentricity the directions of the axial lines of the rotor and the stator deviate from each other, in which case the variation of the air gap changes when moving along the axial line. In practice, eccentricity is often a combination of cylindrical eccentricity and conical eccentricity.

Eccentricity may be static or dynamic. In static eccentricity the rotating axis of the rotor may be in its place but off the stator's central line. In dynamic eccentricity the symmetry axis of the rotor is rotating around the symmetry axis of the stator. Static and dynamic eccentricity may also exist at the same time.

The air gap is not constant in the whole area between the stator and the rotor if the surface shapes of the stator and the rotor are not similar, For example, if the cross-cutting of the cross-section of the rotor is slightly oval or otherwise deformed and deviates from the circular form, there is variation in the rotor's air gap. This is also valid when the side of the stator facing the rotor is deformed. In this case the air gap can be deformed, even though the symmetry axes of the stator and rotor are coherent.

Eccentricity and the deformation of the air gap weaken the performance and characteristics of the electrical machine, causing, for example, strong vibration. In this sense the characteristics of electrical machines deviate largely, and, for example, an asynchronous machine may have strong electrical vibration when the eccentricity is more than five percent of the length of the air gap. In a synchronous machine similar electrical vibration exists when the eccentricity is about ten percent of the length of the air gap.

The growth of the air gap leads to a great need for exciting power, in which case the losses of excitation winding become inefficiently large. Small machines have a relatively small air gap, which allows only a small mechanical eccentricity. In this sense, a synchronous machine equipped with an excitation winding is preferable to an asynchronous machine because the excitation winding is separated and the exciting current required by a large air gap does not strain the power winding. However, the growth of exciting current in synchronous machines equipped with the excitation windings can lead to expensive and complex solutions and reduce loadability.

In permanent-magnet synchronous machines the exciting power is formed with permanent magnets. The permanent magnets can produce sufficient exciting power, even for a large air gap, without compromising the performance of the machine.

The dimensioning and manufacturing instruction can be zero tolerance, that is, the central axis of the stator and the central axis of the rotor are united, in which case the rotor will rotate exactly around the central axis of the stator, and the air gap between the stator and the rotor is constant through the whole area between the outer circumference of the rotor and the inner circumference of the stator. Correspondingly, the air gap in machines with external rotors is constant in the area between the inner circumference of the rotor and the outer circumference of the stator. However, in practical applications there may be situations in which this requirement may have to be compromised because perfect centricity is not possible to reach due to the manufacturing technology or the application. In a large and slow electrical machine with a small air gap even a slight eccentricity can cause a large percentage variation of the air gap. In applications in which the stator and the rotor of the electrical machine are installed separately or the rotor forms a part of a device, the installation accuracy can be difficult or impossible to reach without expensive additional work or structures.

SUMMARY

A permanent-magnet synchronous machine is disclosed, comprising: a stator; and a rotor located at a distance of an air gap ($\delta_1$) from the stator, which rotor is supported in a rotating arrangement on a shaft, whereby a maximum value has been specified for eccentricity between the stator and the rotor, which maximum value is higher than one-tenth of the air gap, whereby magnetization of the synchronous machine is arranged with permanent magnets fitted in the rotor, which are of thickness H in a direction of a magnetic flux and which are used for creating the magnetic flux ($\phi$) which is closed via the stator, the air gap ($\delta_1$) and the rotor, wherein between the permanent magnet's thickness H and the maximum value of eccentricity $\epsilon$ it applies a formula:

$$H \geq (10^*\epsilon - \delta)^* \mu_r,$$

where $\delta$ is a dimensioning value of the air gap, and $\mu_r$ is relative permeability of the permanent magnet.

A method is also disclosed for manufacturing and installing a permanent-magnet synchronous machine having a stator and a rotor supported in a rotating arrangement at a distance of an air gap ($\delta_1$) from the stator, comprising: installing the rotor eccentrically in relation to the stator so that its largest allowed eccentricity is at least one-tenth of the air gap, the rotor having permanent magnets with a thickness of H in a direction of a magnetic flux; and manufacturing and installing the rotor so that between the permanent magnet's thickness H, the rotor's highest allowed eccentricity $\epsilon$ and the air gap's dimensioning value $\delta$ a formula is applied as follows:

$$H \geq (10^*\epsilon - \delta)^* \mu_r,$$

where $\mu_r$ is relative permeability of the permanent magnet.

BRIEF DESCRIPTION OF THE DRAWINGS

In the following the invention will be described in more detail with the help of certain embodiments by referring to the enclosed drawings, where.

DETAILED DESCRIPTION

Figure 1:
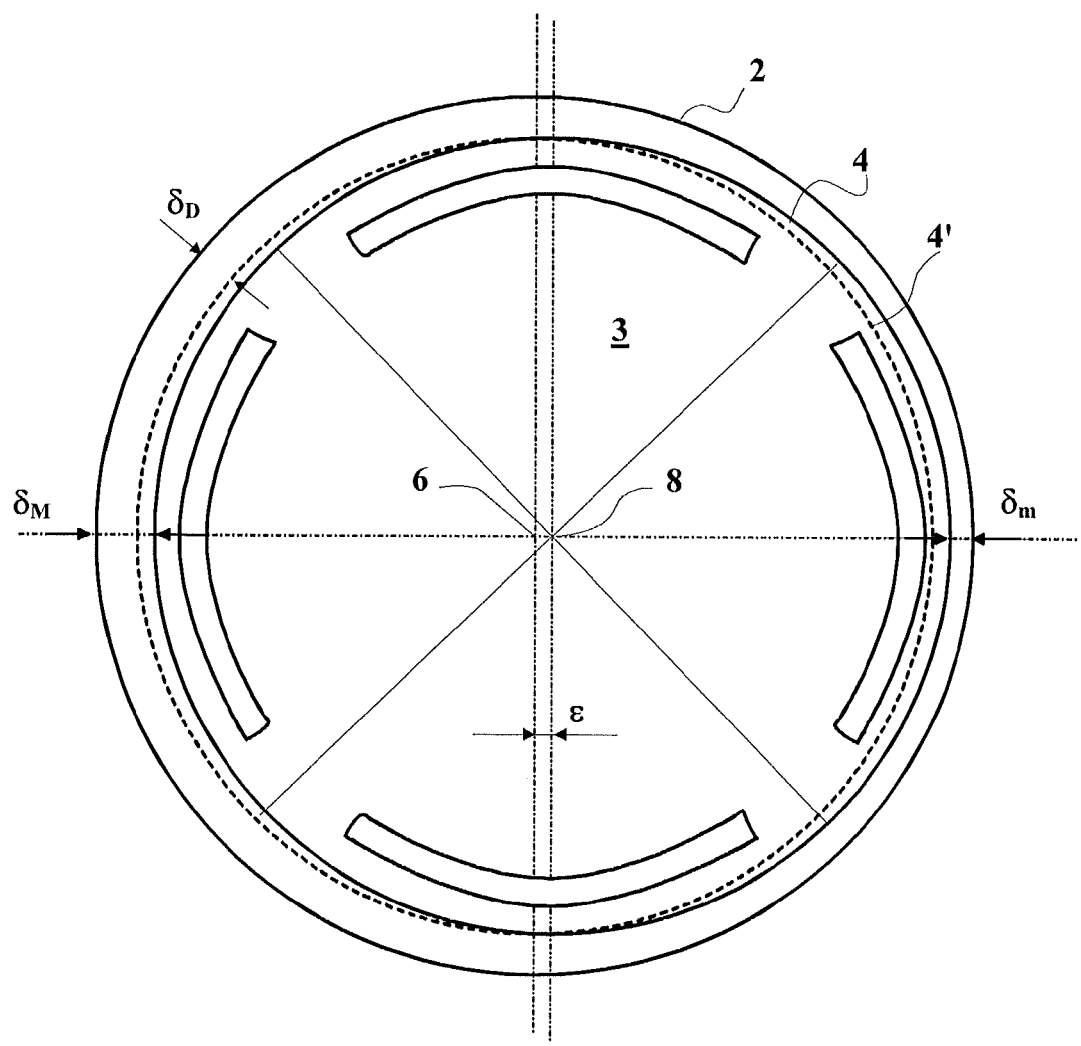
FIG. 1 illustrates the cross-section of an eccentric electrical machine.

A new permanent-magnet synchronous machine is disclosed which allows a large variation of the air gap between the rotor and the stator.

According to exemplary embodiments, a permanent-magnet synchronous machine comprises a stator and, with an air gap to the stator, a rotor which is supported on a shaft in a rotating manner. The eccentricity between the stator and the rotor has a defined maximum value which is larger than one tenth of the air gap, and the exciting of the synchronous machine has been arranged with rotor-fitted permanent magnets which have the thickness H in the direction of magnetic flux and which create the magnetic flux ($\phi$), which is closed via the stator (14), the air gap ($\delta_1$) and the rotor (12). Between the permanent magnet thickness H and the maximum value of eccentricity c it applies a formula:

$$H \geq (10*\epsilon - \delta)*\mu_r,$$

in which $\delta$ is the dimensioning value of the air gap and $\mu_r$ is the relative permeability of the permanent magnet. It will be understood that the dimensioning value of the air gap means the measurement of the air gap between the stator and the rotor which was used in the machine's design.

In an exemplary method for manufacturing and installing a permanent-magnet synchronous machine, the synchronous machine comprises a stator, and a rotor supported in a rotating manner with an air gap to the stator, which rotor is installable in an eccentric relationship to the stator. In the method to manufacture and install a permanent-magnet synchronous machine, the synchronous machine includes a stator, and a rotor is supported in a rotating manner to have an air gap to the stator. The rotor is installable in an eccentric relationship to the stator in a way that its largest allowed eccentricity is at least one tenth of the air gap and the rotor includes permanent magnets which have a thickness H in the direction of the magnetic flux. The rotor is manufactured and installed in a way that the permanent magnet thickness H, the largest allowed eccentricity of the rotor $\epsilon$ and the dimensioning value of the air gap $\delta$ form a formula:

$$H \geq (10*\epsilon - \delta)*\mu_r,$$

in which $\mu_r$ is the relative permeability of the permanent magnet.

In electrical machines excited by permanent magnets, the effective air gap having an effect on the characteristics and operation of the electrical machine deviates significantly from the physical air gap of the electrical machine. The effective air gap is affected not only by the physical air gap itself, which can be detected and measured between the stator and the rotor, but also by other parts in the way of the magnetic flux, if those parts have very similar permeability to the permeability of air. This observation is utilized when defining the allowed eccentricity, in which case a remarkable percentage change in the physical air gap causes a significantly smaller percentage change in the effective air gap. In a way, the stator of the electrical machine "sees" the air gap to be larger than the physical air gap between the stator and the rotor actually is.

In this case it is possible to create the following formula for the relation of the largest allowed eccentricity $\epsilon$ and the effective air gap, when the deviation of 0.1 is allowed in the effective air gap:

$$0.1*(H/\mu_r + \delta) \geq \epsilon,$$

in which H is the thickness of the permanent magnet in the direction of the magnetic flux, $\mu_r$ is the relative permeability of the permanent magnet, and $\delta$ is the average physical air gap between the stator and the rotor. With this formula it is possible to verify if the thickness of the permanent magnet is sufficient when one wants that a certain eccentricity for the synchronous machine is allowed. Correspondingly, the allowed eccentricity can be defined during installation when the rotor of synchronous machine is fitted to the stator and the characteristics and the thickness of the permanent magnet and the size of the air gap are known.

FIG. 1 illustrates the eccentricity of an electrical machine including a cross-section of the stator, the rotor and the air gap between them in the axial direction. The stator of electrical machine has been supported in a known way and attached to the frame of the electrical machine or a corresponding supporting structure, and the inner circumference 2 of the stator forms a circular circumference with the center point 6. The rotor 3 has been installed and supported in a rotating manner inside the stator, and the outer circumference 4 of the rotor has an air gap $\delta$ to the inner circumference of the stator. The center point 8 has been moved the distance of eccentricity $\epsilon$ aside from the center point 6 of the stator. When the rotor is rotating around its center point 8, the size of the air gap $\delta$ deviates between the smallest value $\delta_m$ and the largest value $\delta_M$ according to the amount of eccentricity $\epsilon$. In the case of FIG. 1, the eccentricity $\epsilon$ is about half of the size of the air gap $\delta$. According to the dimensioning of the electrical machine, the rotor is in the middle of the stator in a way that their center points unite. This is illustrated in the figure with the circular circumference 4', the distance of which from the stator's inner circumference 2 is the air gap dimensioning value $\delta_D$. In the example of FIG. 1, the size of the air gap $\delta$ deviates approximately 50% form the air gap dimensioning value $\delta_D$ which generally is not allowed for an electrical machine without serious failures and damage to the electrical machine or the risk of damage to the device connected to the electrical machine.

Figure 2:
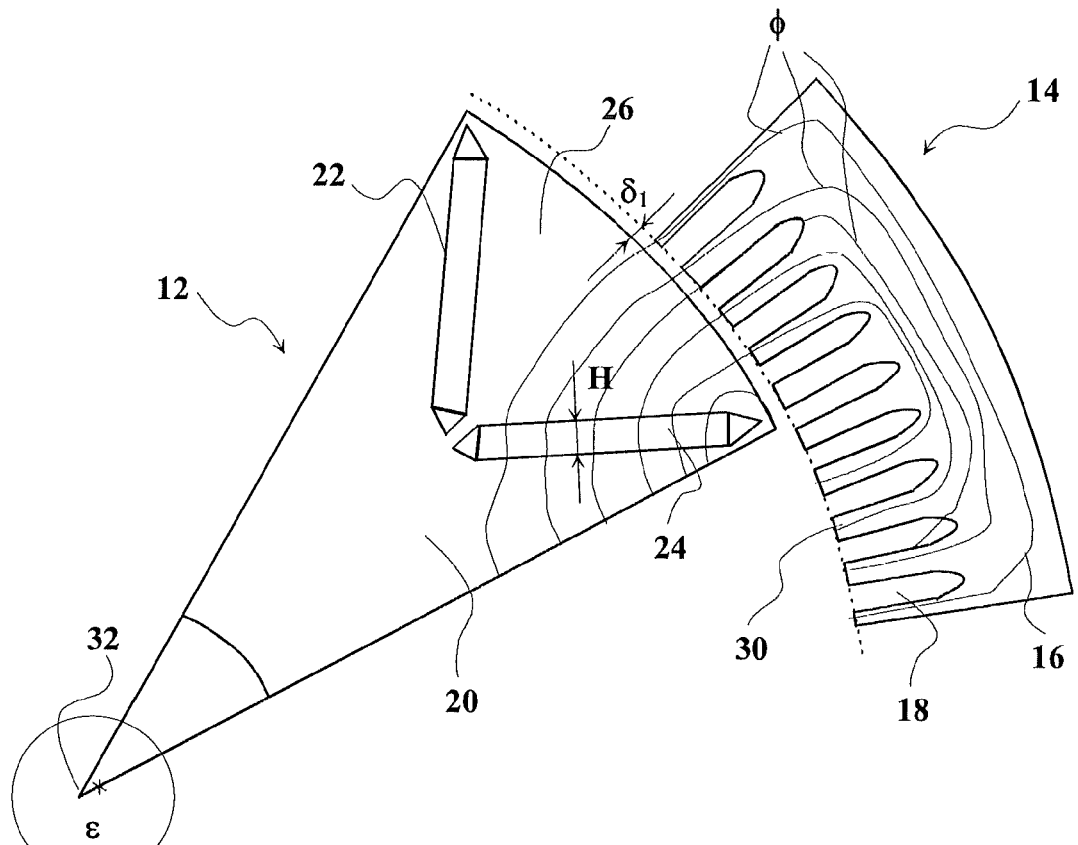
FIG. 2 illustrates the cross-section of an electrical machine according to the invention.

FIG. 2 illustrates a cross-section of a synchronous machine 10, implemented according to the invention, the illustration including one pole 26 of the rotor 12 and the corresponding length of the circumference of the stator 14. The stator includes the sheet pack 16 made of magnetically conductive sheets, the pack including slots 18 to which the stator winding is fitted. The rotor 12 includes a magnetically conductive core part 20 which has holes 22 made for the permanent magnets 24. Two permanent magnets 24 are installed in the V position on the edges of the magnetic pole 26 of the rotor, in which case the similarly named poles of both permanent magnets 24 are facing the pole 26. The distance of the rotor pole center 28 from the stator's inner circumference 30 is the physical air gap $\delta_1$ of the synchronous machine when the rotor does not have eccentricity but the rotor is rotating around its center point 32 and the rotor's center point 32 is at the same time the center point of the stator's inner circumference. In the figure, the flow of the magnetic flux is described with flux lines φ which close through the stator teeth, the stator back, the air gap, the rotor core part, the permanent magnets, and the rotor pole parts. When there is eccentricity in the rotor, in which case the rotation axis deviates the distance ϵ from the center point of the rotor, the size of the air gap changes accordingly. When the value of eccentricity ϵ is 0.1*δ, the size of the physical air gap at the center of the rotor pole deviates from 0.9 . . . 1.1*δ. This range of variation and amount of eccentricity can be regarded as a general design instruction and as an allowed tolerance without risking the reliability and performance characteristics of the synchronous machine.

Figure 2A:
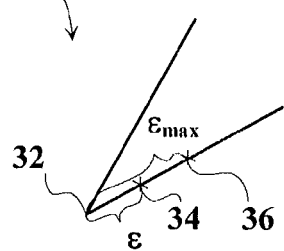
FIG. 2a illustrates a partial enlargement of FIG. 2.

In an application as disclosed herein, a considerably higher value is allowed for eccentricity ϵ, such as 0.5*δ, in which case the magnitude of the air gap can vary from 0.5-1.5*δ. FIG. 2a illustrates a situation where the highest eccentricity value $\epsilon_{max}$=0.5*δ is marked with reference number 36, and eccentricity within the allowed range is marked with reference number 34. Since such eccentricity and the air gap variation caused by it exceeds the allowed value which is possible without harmful electrical vibration, the thickness H of permanent magnet 24 is dimensioned in the magnet flux direction so that when viewed from the stator, the electromagnetic total air gap is sufficiently large. The electromagnetic total air gap comprises the physical air gap and the layers along the path of the main magnetic flux in the rotor. The relative permeability of the layers is of the same magnitude as the relative permeability of air. The relative permeability of a permanent magnet based on commonly used rare earth metals is considerably smaller than that of the ferromagnetic plate used in the rotor, and of the same magnitude as air. For example, the relative permeability of an NdFeB magnet (a neodymium-iron-boron magnet) $\mu_r$ is approximately 1-3.5. When a high value can be allowed for eccentricity ϵ, it is ensured that the permanent magnet's thickness H meets the required condition. The magnitude of the permanent magnet and its thickness with regard to the electrical machine's power and performance are determined based on the specifications set for the machine.

Assuming the permanent magnet permeability as $\mu_r$=1 and the physical eccentricity as ϵ=0.5*δ, the allowed electromagnetic air gap is δ'=0.1*(H+δ), and the following equation can be made:

$$0.1*(H+\delta) \geq \epsilon 0.5*\delta,$$

based on which, the value for the sufficient thickness of the permanent magnet is $$H \geq 4*\delta.$$

According to the Carter coefficient, the magnetic impact of the actual air gap is higher than its mechanical value, which means that a smaller value of the permanent magnet is possible. The permeability of the permanent magnet also affects the dimensioning. According to teaching of the invention, the thickness of the permanent magnet in the embodiment illustrated in FIG. 2 can therefore be equal or higher than 3*δ when the allowed eccentricity for the rotor of the synchronous machine is ϵ=0.5*δ.

Figure 3:
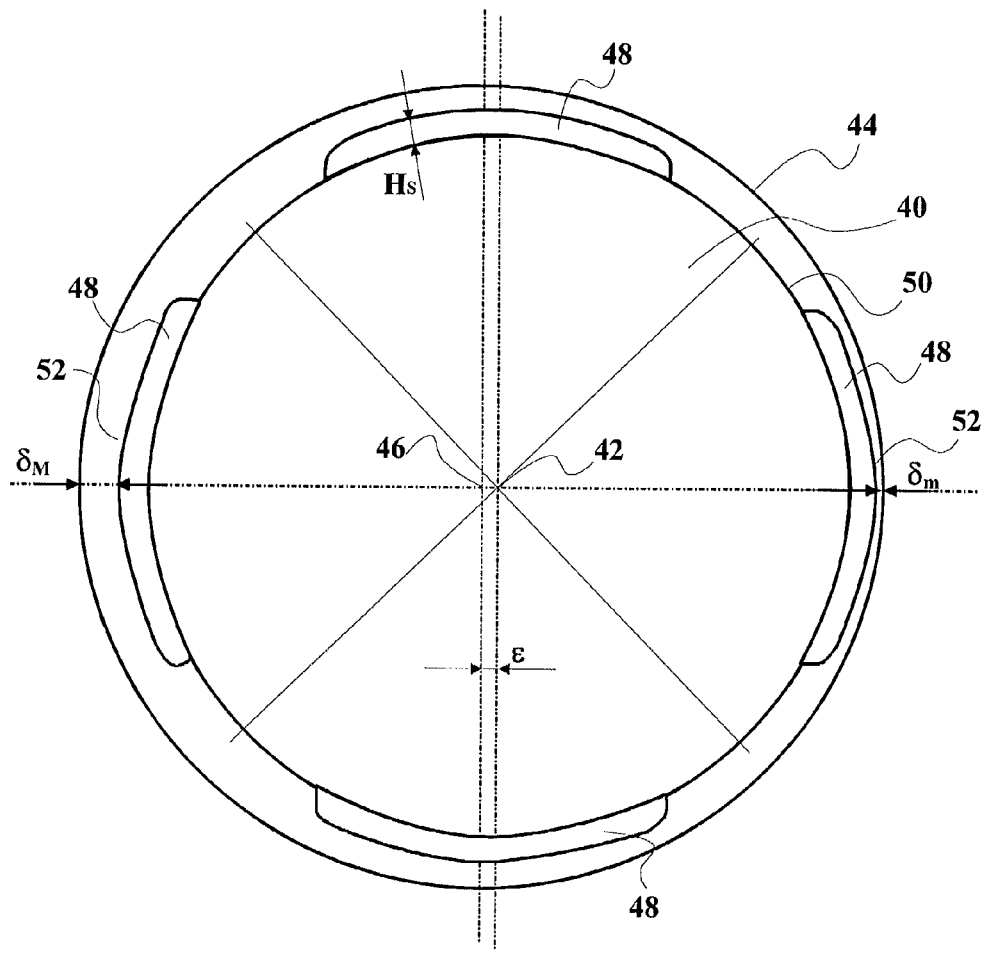
FIG. 3 illustrates the cross-section of another electrical machine according to the invention

FIG. 3 illustrates another exemplary permanent-magnet synchronous machine as disclosed herein, where the magnetization is implemented with permanent magnets installed onto the surface of the outer circumference of the rotor. Rotor 40 rotates around its rotation central shaft 42 which deviates by the eccentricity ϵ from the stator's 44 centre 46. Permanent magnets 48 are fastened onto the rotor's outer circumference 50. The distance (air gap) between the rotor's outermost section, that is, the permanent magnet's 48 surface 52, and the inner surface of the stator varies from $\delta_{min}$ and $\delta_{max}$. Therefore, the physical air gap of the machine varies to a considerably higher extent than is allowed to ensure interruption-free operation. As disclosed herein, the effective air gap varies from $H_S+\delta_{min}$ and $H_S+\delta_{max}$, in which case the variation of the effective air gap is within the allowed range.

Eccentricity tolerance can further be increased by installing parallel branches or levelling compounds in the stator winding.

Figure 4:
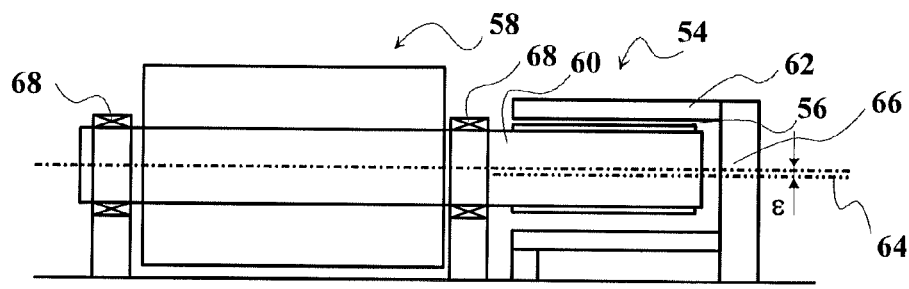
FIG. 4 illustrates a synchronous machine according to the invention connected to a device.

FIG. 4 illustrates an exemplary permanent-magnet synchronous machine 54 disclosed herein. The machine's rotor 56 is fitted on the shaft 60 of the work machine 58. Rotor 56 is cylindrically eccentric to the stator 62, in which case the stator's central axle 64 and the rotor's central shaft 66 are parallel, but at a distance ϵ from each other. The work machine is supported in rotating arrangement with bearings 68 to the base, in which case the synchronous machine's 54 rotor 56 is also supported with bearings 68 which are separate from the support of the synchronous machine and its stator 62. Work machine 54, comprising shaft 60 and the synchronous machine's rotor 56 adjusted to it, can be manufactured and installed separately, and the synchronous machine stator 62 and the rotor 56 are only connected electromagnetically to each other at the operating site. Eccentricity between the stator and the rotor can be allowed in the arrangement according to the invention. Correspondingly, the rotor can also be conically eccentric, in which case the central shafts of the stator and the rotor are slightly in different directions, and the eccentricity changes in the lengthwise direction of the shaft.

The present disclosure is also applicable to other irregularities in air gap variation than eccentricity between stator and rotor shafts. Therefore, an air gap change caused by the stator's or rotor's surfaces facing the air gap can be compensated for in an arrangement according to the invention.

In the above, exemplary embodiments have been described with the help of certain embodiments. However, the description should not be considered as limiting the scope of patent protection; the embodiments of the invention may vary within the scope of the following claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A permanent-magnet synchronous machine, comprising:

a stator; and a rotor located at a distance of an air gap ($\delta_1$) from the stator, which rotor is supported in a rotating arrangement on a shaft, whereby a maximum value has been specified for eccentricity between the stator and the rotor, which maximum value is higher than one-tenth of the air gap, whereby magnetization of the synchronous machine is arranged with permanent magnets fitted in the rotor, which are of thickness H in a direction of a magnetic flux and which are used for creating the magnetic flux (φ) which is closed via the stator, the air gap ($\delta_1$) and the rotor, wherein between the permanent magnet's thickness H and the maximum value of eccentricity ϵ it applies a formula:

$$H \geq (10*\epsilon - \delta)*\mu_r,$$

where δ is a dimensioning value of the air gap, and $\mu_r$ is relative permeability of the permanent magnet.

2. A synchronous machine according to claim 1, wherein the maximum value of eccentricity ϵ is half of the air gap ($\delta_1$).

3. A synchronous machine according to claim 2, wherein the permanent magnet's relative permeability $\mu_r$ is less than 3.5 and the permanent magnet's thickness (H) is at most ten times the dimensioning value of the air gap.

4. A synchronous machine according to claim 3, wherein the maximum value of eccentricity ϵ is half of the dimensioning value of the air gap, the permanent magnet's relative permeability $\mu_r$ is approximately 1, and the permanent magnet's thickness is higher than the air gap's dimensioning value multiplied with a factor of 3.

5. A synchronous machine according to claim 4 wherein the rotor's eccentricity ranges between 0.2 times the air gap's dimensioning value, and 0.5 times the air gap's dimensioning value.

6. A synchronous machine according to claim 5, wherein the rotor of the synchronous machine is supported onto a shaft of a driving machine connected to it.

7. A synchronous machine according to claim 6, wherein the permanent magnets are fitted on an outer surface of the rotor.

8. A synchronous machine according claim 7, wherein the permanent magnets are fitted in a V shape in the rotor.

9. A synchronous machine according claim 6, wherein the permanent magnets are embedded inside a magnetically conductive core of the rotor.

10. A synchronous machine according claim 9, wherein the permanent magnets are fitted in a V shape in the rotor.

11. A synchronous machine according to claim 1, wherein the permanent magnet's relative permeability $\mu_r$ is less than 3.5 and the permanent magnet's thickness (H) is at most ten times the dimensioning value of the air gap.

12. A synchronous machine according to claim 1, wherein the maximum value of eccentricity ϵ is half of the dimensioning value of the air gap, the permanent magnet's relative permeability $\mu_r$ is approximately 1, and the permanent magnet's thickness is higher than the air gaps's dimensioning value multiplied with a factor of 3.

13. A synchronous machine according to claim 1, wherein the rotor's eccentricity ranges between 0.2 times the air gap's dimensioning value, and 0.5 times the air gap's dimensioning value.

14. A synchronous machine according to claim 1, wherein the rotor of the synchronous machine is supported onto a shaft of a driving machine connected to it.

15. A synchronous machine according to claim 1, wherein the permanent magnets are fitted on an outer surface of the rotor.

16. A synchronous machine according to claim 1, wherein the permanent magnets are embedded inside a magnetically conductive core of the rotor.

17. A synchronous machine according claim 16, wherein the permanent magnets are fitted in a V shape in the rotor.

18. A method for manufacturing and installing a permanent-magnet synchronous machine having a stator and a rotor supported in a rotating arrangement at a distance of an air gap ($\delta_1$) from the stator, comprising:
  installing the rotor eccentrically in relation to the stator so that its largest allowed eccentricity is at least one-tenth of the air gap, the rotor having permanent magnets with a thickness of H in a direction of a magnetic flux; and
  manufacturing and installing the rotor so that between the permanent magnet's thickness H, the rotor's highest allowed eccentricity ϵ and the air gap's dimensioning value δ a formula is applied as follows:

$$H \geq (10*\epsilon - \delta)*\mu_r,$$

where $\mu_r$ is relative permeability of the permanent magnet.

19. A method according to claim 18, comprising:
  manufacturing a rotor support in relation to the stator with such a tolerance that the rotor's highest allowed eccentricity ranges between 0.2 times the dimensioning value of the air gap and 0.5 times the dimensioning value of the air gap.

* * * * *